April 7, 1942.  E. H. PIRON  2,278,712
SUPER RESILIENT WHEEL
Filed Nov. 29, 1940
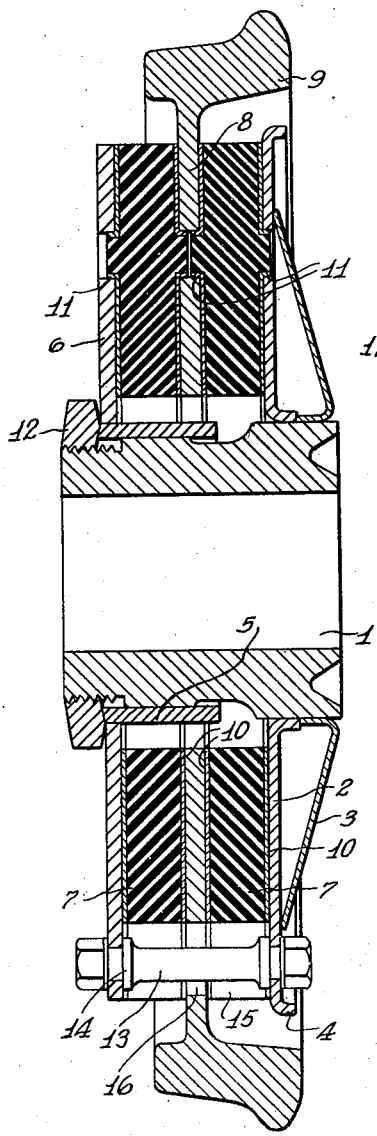
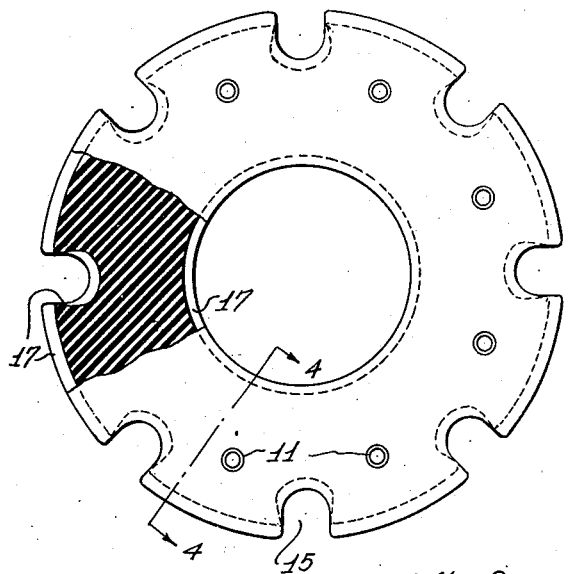
Fig. 2.
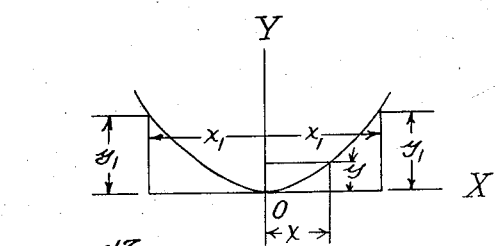
Fig. 3.
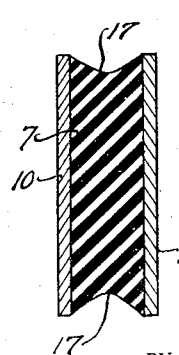
Fig. 4.
Fig. 1.
INVENTOR.
Emil H. Piron
BY
ATTORNEY.

Patented Apr. 7, 1942

2,278,712

UNITED STATES PATENT OFFICE 2,278,712

SUPERRESILIENT WHEEL

Emil H. Piron, New York, N. Y., assignor to Transit Research Corporation, New York, N. Y., a corporation of New York Application November 29, 1940, Serial No. 367,826

6 Claims. (Cl. 267—63)

This invention relates to resilient wheels adapted for use on rails, of the particular type wherein elastic elements of rubber or similar material are stressed in shear by relative radial movements of the tire and hub.

Wheels of this general type are coming into wide usage particularly for street cars where the problem of quietness is highly important. All such wheels, to date, are equipped with comparatively thin rubber elements of substantial hardness in order to keep well within safe operating limits. Long experimentation has now revealed the manner of constructing these wheels and of selecting rubber springing elements therefor such that a material improvement in sound deadening and in riding quality results. The object of this invention is to reveal the manner in which these improved results are attained.

More specifically it is an object of this invention to provide springing elements of optimum size, thickness, durometer hardness and shape to accomplish the above objects and, further, to provide a peripheral shape which will safeguard the elements against surface cracks and deterioration which readily spread through the interior thereof.

Resilient rail vehicle wheels of the type here concerned comprise hub and tire plates, connected to the tire and hub of the wheel respectively, and connected together by elastic springing elements in such manner that the plates may move relatively. The elastic elements are formed of rubber, or its equivalent, and act in radial shear to resist radial forces and in torsional shear to resist torsional forces such as result from driving or braking. It has been found necessary, for practical reasons, to groove the inner and outer peripheral edges of the elastic elements, because the elastic elements are maintained under compression by the plates to which they are connected. If the grooving is omitted, compression of the elastic elements causes the peripheral or contour edges to bulge, and bulging of the elements places the rubber at the contour edges under tension stresses which cause cracks to develop in the elements.

The grooving, however, in order to be efficient, must have certain characteristics which, if not respected, result in different troubles. For example, if the depth of the groove is not properly related to the width of the element, an amount of bulging sufficient to cause cracking still appears. If the reverse condition is present and the groove is too deep, not only is the working sectional area unnecessarily reduced, but folding of the rubber appears at the bottom of the groove, and causes the rubber to gum and destroy itself. Both of these conditions, tension and folding, may be present at the same time if the contour of the groove is not correct, with the result that cracking may appear in one region and gumming in another.

The main object of this invention is to teach the formation of a groove which is correctly proportioned and shaped to eliminate the destructive conditions above noted.

Other objects and advantages will become more fully apparent as reference is had to the accompanying drawing wherein my invention is illustrated, and in which Fig. 1 is a transverse diametric cross section of a wheel with the springing element fully compressed, Fig. 2 is an elevation of an elastic spring, with a small portion thereof broken away and in cross section, Fig. 3 is a diagram illustrating the curvature of the grooves in the elastic spring, and Fig. 4 is a transverse section taken along the line 4—4 of Fig. 2.

More particularly, I designates a wheel hub having a main radial plate 2 welded or otherwise fixedly secured thereto. A conical brace plate 3 extends from the hub to an attaching point or attaching circle near the periphery of the main plate 2. This plate 3, together with an outwardly flared flange portion 4, rigidifies the main plate 2.

A sleeve 5 fits onto the hub 1 and carries a second main plate 6, which extends radially therefrom. As the sleeve 5 and its plate 6 is slid onto the hub 1, it imposes compression on two elastic springing elements 7 which support a tire carrying plate 8. A rail contacting tire 9 is integrally connected to the plate 8.

Each of the elastic springing elements 7 has two metallic discs 10 of some suitable thin material the surface of which is bonded thereto and both discs 10 of an element are dowelled at 11 to respective main plates and to the tire carrying plate 8. A nut 12, on the hub 1, maintains the sleeve 5 with its plate 6 compressing the elastic springs 7 so that relative radial movements between the tire plate 8 and the hub plates 2 and 6 are sustained by the elements 7, acting in shear.

Lateral forces between the tire 9 and hub 1 will, of course, tend to spring the plate 6 outwardly, and to prevent this action the plate 6 is connected to the plates 2 and 3 by a multiplicity of bolts 13 having spacer shoulders 14 thereon. The bolts 13 extend through recesses or scallops 15 in the springing elements 7, and through openings 16 in the tire carrying plate 8. The recesses or scallops 15 in the elastic elements 7 comprise a series of peripheral, U-shaped radially disposed cut out portions.

The above described wheel construction is intended to generally represent any of the many conventional as well as specially designed resilient rail vehicle wheels, wherein elastic shear springs, commonly called rubber or elastic sandwiches, are maintained in compression and act in shear to support the rim or tire with respect to the hub. It has been found, in service, that compression of the springs is essential. Compression, however, ordinarily causes the contour edges of the spring to bulge, which places such edges under tension stresses which ultimately cause cracks to develop in the rubber. This problem has been recognized heretofore and the solution proposed teaches the grooving of the contour edges of the elastic springs.

If the contour edges of the springs are grooved, however, the grooves, in order to be efficient, must have certain proportions and characteristics which if not respected result in the development of further troubles. For example, if the grooves are not sufficiently deep, a certain amount of bulging still appears in the compressed condition, and subsequent cracking of the rubber is not avoided. If the grooves are made too deep, the working sectional area of the spring is unnecessarily reduced, and in addition, folding of the rubber appears at the bottom of the groove and causes the rubber to gum and destroy itself. The cross sectional shape of the groove also is an important consideration, for the reason that if the contour is not correct, and within certain limits, folding or tension may appear in different locations, sometimes individually and sometimes simultaneously. Either or both of these conditions is followed by gumming or self destruction.

According to the present invention the inner and outer contour edges of the springing elements 7, as well as the contour edges of the recesses or scallops 15, are grooved in the manner indicated at 17 in Figs. 2 and 3, and the groove has a particular cross sectional shape diagrammatically shown more clearly in Fig. 3. This groove, as shown in Fig. 3, has a shape which follows the general equation of a parabola, which is $x^2 = ay$, where the X-axis is a tangent to the bottom of the groove, and where the axis Y passes through the point of contact between the axis X and the bottom of the groove. The parameter $a$ of the parabola must have a value given in inches by $a = 0.0852r + 0.58$, where $r$ is the radius of the contour edge of the sandwich, at the point where the cross section of the groove is considered.

The depth of the groove, or $y$ dimension at the bottom of the groove according to the diagram, is given by the relation $$y = \frac{x^2}{a}$$

when $x$ equals one half of the thickness of free rubber, $y$ equals the height of the contour of the groove above the X axis tangent to the bottom of the groove, which value, in this particular case, is equal to the depth of the groove. In the diagram, the sign $x_1$ represents the particular value of $x$ equal to half the thickness of the free rubber, and $y_1$ represents the corresponding $y$. The depth of the groove at any point a distance $x$ from the median axis Y of the curve is then represented by $y_1 - y$.

Taking for example, a rubber sandwich 1.46 inches thick, having an outer radius of 10 inches, an inner radius of 4.25 inches at the center hole, and an inner radius of 1.25 inches at the scallops 15. Then, if $$r = 10'' \quad 4\tfrac{1}{4}'' \quad 1\tfrac{1}{4}''$$
$$a = 1.44'' \quad 0.95'' \quad 0.70''$$

and if $$x_1 = 0.73'' \ (x_1^2 = 0.533'')$$
$$y_1 = 0.37'' \quad 0.56'' \quad 0.76''$$

The rest of the contour of the groove is given respectively by $$x^2 = 1.44y \quad 0.95y \quad 0.70y$$

In practice, the contour of the grooves will vary somewhat from the specific proportions given above, because of the extreme difficulty in accurately shaping mechanical parts, especially rubber parts, to maintain the exact dimensions of a given design. Variations, within reasonable limits, although obviously reducing the efficiency, do not materially impair the function of the groove unless such variations are excessive. Experience has proven that for a given value of X, a variation of plus or minus 20% may be satisfactory, but the variation must, of course, be maintained as low as possible, for a variation even within this range is liable to start some incipient folding in the rubber.

Although a specific embodiment of the invention has been illustrated and described, it will be understood that various changes may be made within the scope of the appended claims without departing from the spirit of the invention and such changes are contemplated.

What is claimed is:

1. A shear spring comprising a disc of elastic plastic material adapted to be compressed when placed in service, said spring having a circumferentially extending groove in its peripheral edge, said groove having a cross sectional contour corresponding to the shape of a parabola when said disc is free from compression, with the contour of the parabola following within approximately 20% plus or minus the equation $$x^2 = ay$$

where $x$ is the abscissae measured from the median axis of the groove, where $a$ equals $0.0852r$ plus 0.588 with $r$ being the radius of the grooved edge at the point where the contour of the groove is being considered, and $y$ serves to determine the depth of the groove for any value of $x$.

2. A shear spring comprising a disc of elastic plastic material adapted to be compressed when placed in service, said spring having a circumferentially extending groove in its peripheral edge, said groove having a cross sectional contour corresponding to the shape of a parabola when said disc is free from compression, with the depth of the groove given within approximately 20% plus or minus by the relation $$y_1 = \frac{x_1^2}{a}$$

where $y_1$ equals the depth of the groove, $x_1$ equals one half the width of the groove, and $a$ equals $0.0852r$ plus 0.588 with $r$ being the radius of the grooved edge under consideration.

3. A shear spring comprising a disc of elastic plastic material having an opening extending axially therethrough, the wall of said opening having a groove extending circumferentially therearound, said groove having a cross sectional shape of a parabola following within plus or minus 20% of the equation $$x^2 = ay$$

where $x$ is a dimension measured from the median axis of the groove, where $a$ equals $0.0852r$ plus $0.588$ with $r$ being the radius of the opening at the point where the shape of the groove is considered, and $y$ determines the shape of the groove.

4. A shear spring comprising a disc of elastic plastic material having an opening extending axially therethrough, the wall of said opening having a groove extending circumferentially therearound, said groove having a cross sectional shape of a parabola, with the depth of the groove given within approximately 20% plus or minus by the relation $$y_1 = \frac{x_1^2}{a}$$

where $y_1$ equals the depth of the groove, $x_1$ equals one-half the width of the groove and $a$ equals $0.0852r$ plus $0.588$ with $r$ being the radius of the opening at the point where the groove section is considered.

5. A shear spring comprising a disc of elastic plastic material adapted to be compressed when placed in service, said disc having an axial opening therethrough, said spring having a groove in its outer peripheral edge and a groove extending circumferentially around the wall of said opening, said grooves having a cross sectional contour corresponding to the shape of a parabola when said disc is free from compression, the parabola in each case following within 20% plus or minus of the equation $$x^2 = ay$$

where $x$ is a dimension measured from the median axis of the groove, where $a$ equals $0.0852r$ plus $0.588$ with $r$ being the radius of the disc at the point where the groove is considered, and $y$ determines the depth of the groove.

6. A shear spring comprising a disc of elastic plastic material adapted to be compressed when placed in service, said disc having an axial opening therethrough, said spring having a groove in its outer peripheral edge and a groove extending circumferentially around the wall of said opening, said grooves having a cross sectional contour corresponding to the shape of a parabola when said disc is free from compression, the depth $y_1$ of the groove in each case being within 20% plus or minus of the equation $$y_1 = \frac{x_1^2}{a}$$

where $x_1$ equals one-half the width of the groove, and $a$ equals $0.0852r$ plus $0.588$ with $r$ being the radius of the disc at the point where the groove is considered.

EMIL H. PIRON.